Jan. 7, 1964     L. HUNTER     3,116,562
VEHICLE WHEEL ALIGNMENT MEASURING DEVICE
Filed July 5, 1960     2 Sheets-Sheet 1

INVENTOR:
LEE HUNTER
BY Gravely, Lieder & Woodruff
ATTORNEYS.

Jan. 7, 1964     L. HUNTER     3,116,562
VEHICLE WHEEL ALIGNMENT MEASURING DEVICE
Filed July 5, 1960     2 Sheets-Sheet 2

INVENTOR:
LEE HUNTER
BY Gravely, Lieder & Woodruff
ATTORNEYS.

United States Patent Office 3,116,562
Patented Jan. 7, 1964

3,116,562
VEHICLE WHEEL ALIGNMENT MEASURING DEVICE
Lee Hunter, Rte. 1, Box 136, Creve Coeur, Mo.
Filed July 5, 1960, Ser. No. 40,641
2 Claims. (Cl. 33—203.17)

There are many devices adapted for the purpose of measuring and determining vehicle wheel toe alignment. Some of these devices are very complicated and expensive because they are designed to check out wheel alignment characteristics in all particulars, thereby involving a degree of skill in the use thereof which is generally acquired only after extensive training and long experience. There are other devices which are especially adapted for one type of measuring, such as the toe characteristic of vehicle wheels. In this class of device it is most usual to require special means for locating the wheels, for elevating the vehicle and for attaching measuring means to the vehicle or its wheels. This class of device is also complicated and requires a high level of skill for its proper use.

An object of this invention is to provide a unique and uncomplicated device for measuring and determining wheel toe characteristics whereby great accuracy is obtained with a minimum of preparation of the vehicle.

It is also an object of this invention to provide a toe measuring device which is easily and quickly moved about and brought to the vehicle wheels while the vehicle is standing on any convenient level or relatively flat surface such as a service station drive-way, garage floor or the like.

It is another object of this invention to provide a portable toe measuring device having a simple frame for straddling the wheels and adjustable to the wheel spacing and size so that one service man can easily use the device and obtain accurate results.

These and other objects will be particularly pointed out in connection with the following description of a preferred embodiment wherein the device is constructed to provide a frame composed of a base member movably mounted on portable carriages which may be adjustably spaced, and arms extending from the base bar toward the wheels for simultaneous adjustment so that similar contact points on the opposite wheels may be selected during the measurement of the toe characteristic for such wheels. The arms of the device support axially aligned and spaced point of contact fingers which, by construction, are equidistant from the base bar, and at least one of the fingers operates a measuring head embodying a scale and movable pointer responsive to the contact finger.

Figure 1:
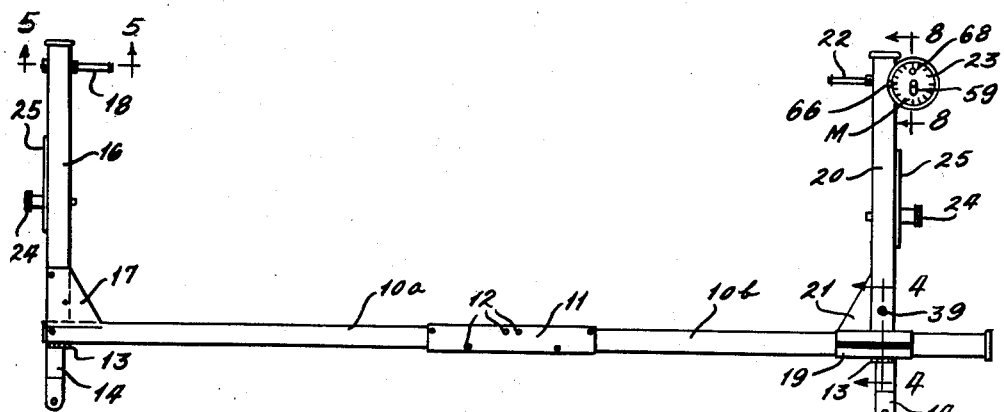
FIG. 1 is a top plan view of the device hereinafter to be described.
Figure 2:
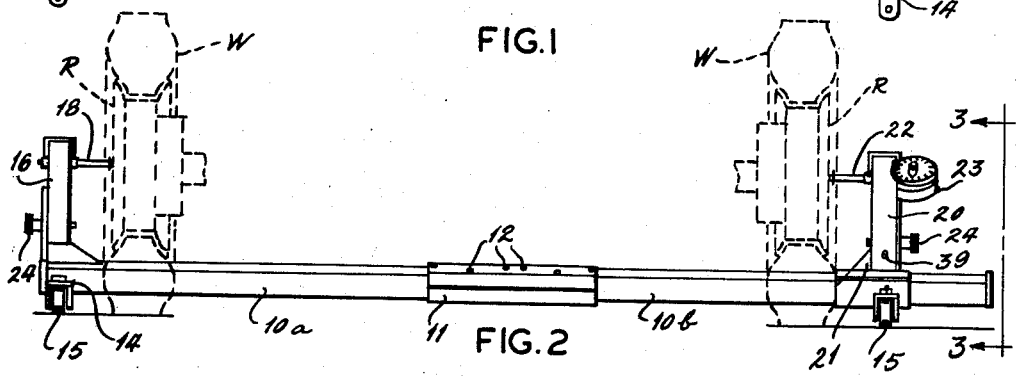
FIG. 2 is an elevational view of the front of the device shown in FIG. 1.
Figure 3:
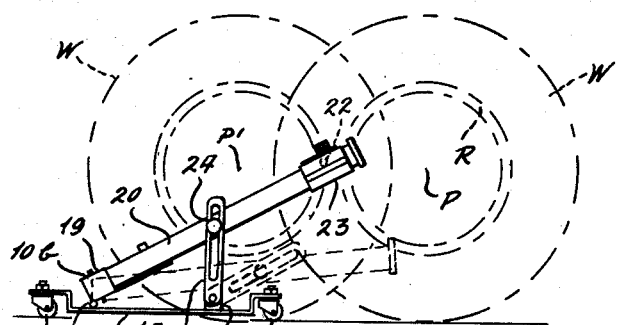
FIG. 3 is an end view taken at line 3—3 in FIG. 2.

The preferred embodiment of the present device is illustrated in FIGS. 1, 2 and 3. It is seen to comprise a base bar formed in two sections 10a and 10b secured together by a connector sleeve 11. Each section of the base bar is formed from hollow rectangular stock (FIG. 4) so that the bar is relatively rigid in bending and twisting, and resistant to torque reaction between its ends. The connecting sleeve 11 is suitably secured by elements 12 so that the parts may be separated for shipment in a disassembled state. The left end of the bar is provided with a pivot or hinge 13 connected to a carriage member 14 supported on castering rollers 15. This end of the bar supports an arm 16 secured in a rigid right angular position and braced by a corner member 17. A contact finger 18 is operatively mounted near the outer end of the arm 16 in a manner to be described later. The opposite base bar section 10b carries an adjustable slide 19 connected by a pivot or hinge 13 to a carriage member 14 (similar to the first described carriage) having castering rollers 15. The slide 19 supports an arm 20 in rigid right angular relation assisted by a corner brace 21. The arm 20 is parallel with the opposed arm 16 and supports a contact finger 22 near its outer end. The finger 22 is operatively connected to a measuring head 23 later to be described.

The device above described is rigidly constructed of tubular parts having a large cross-section ratio so that relatively little angular deflection or twist is experienced in the base bar and arms 16 and 20, whereby the parallelism of the arms 16 and 20 is retained and the device may be easily rolled and maneuvered about a vehicle from either end by rolling on the carriages 14. The hinges 13 permit the arms 16 and 20 to be elevated from a folded position (broken outline in FIG. 3) to the desired position adjacent the vehicle wheels W. Each arm 16 and 20 carries a clamp element 24 associated with a slotted brace 25 each brace being pivoted on a bracket 26 (FIG. 3) secured to the carriages 14.

Figure 5:
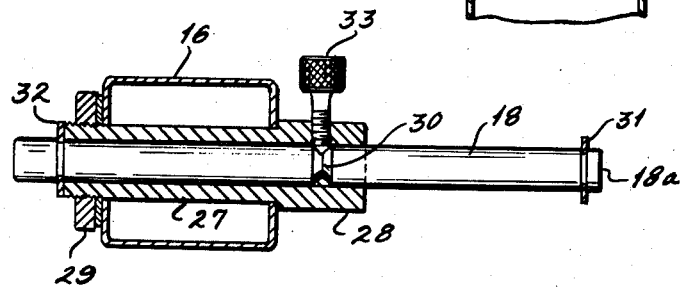
FIG. 5 is another fragmentary sectional view, on an enlarged scale, taken at line 5—5 in FIG. 1.

As seen in FIGS. 1 and 5, the finger 18 carried by arm 16 is slidably mounted in a sleeve 27 secured in the arm 16 between an enlarged head 28 and a threaded retainer nut 29. The finger 18 is formed with an intermediate groove 30 and with stops 31 and 32 near its ends. A set screw 33 threaded in the sleeve head 28 is adapted to seat in the groove 30 and hold the finger 18 with its contact end 18a extended and the stop 32 against the nut 29. The set screw 33 may be backed out of groove 30 when the finger 18 is retracted against the stop 31 to an inoperative position while the device is being maneuvered into position.

Figure 4:
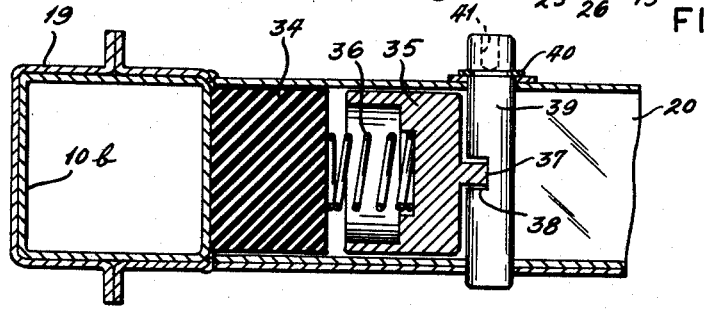
FIG. 4 is a fragmentary sectional view, on an enlarged scale, taken at line 4—4 in FIG. 1.

As seen in FIGS. 1 and 4, the adjustable sleeve 19 is composed of mating halves secured together so that it slidably embraces the base bar section 10b. A friction-type retaining assembly for the adjustable sleeve 19 is operatively mounted in the base of arm 20. This assembly includes a friction block 34 non-rotatably housed in the open end of the arm so as to contact the adjacent surface of base bar section 10b. A non-rotatable follower element 35 is spaced from the block 34 by a pressure spring 36 seated in a recess in the follower 35. The follower 35 is formed with a projection 37 which engages in a transverse cam slot 38 in a rotary shaft 39 secured in the opposite walls of the arm 20 by a lock ring 40. One end of the shaft 39 is provided with a wrench socket 41 whereby the shaft may be rotated one-half turn to force the follower element 35 toward the block 34 to force the latter against the base bar section 10b. The view of FIG. 4 illustrates the shaft in its released position so that the sleeve 19 may be adjusted along the base bar section 10b.

Figure 6:
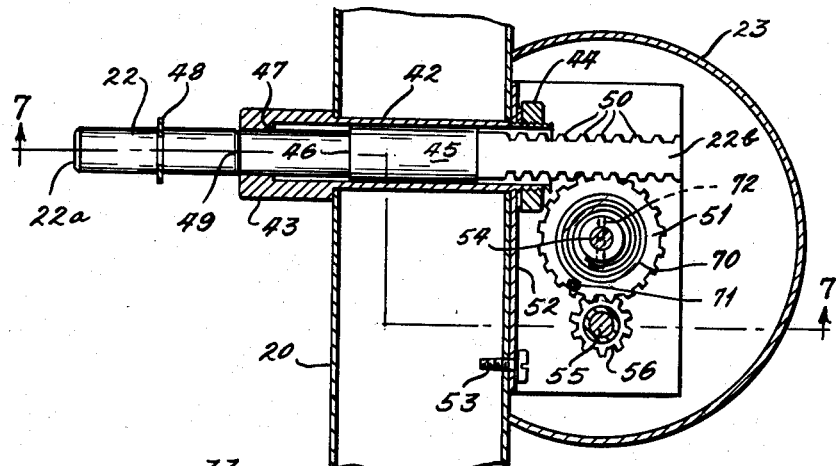
FIG. 6 is a further fragmentary sectional view, on an enlarged scale, taken at line 6—6 in FIG. 7.
Figure 7:
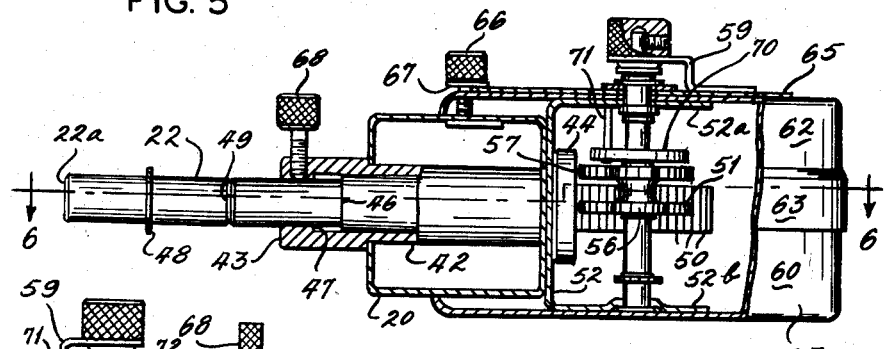
FIG. 7 is a sectional view taken at line 7—7 in FIG. 6.
Figure 8:
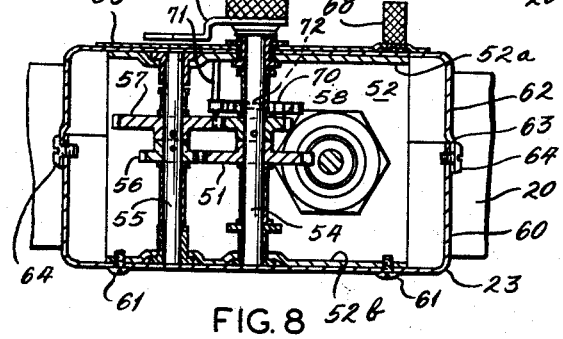
FIG. 8 is a fragmentary sectional view, on an enlarged scale, taken at line 8—8 in FIG. 1.

Turning now to FIGS. 6, 7 and 8, it may be seen that the arm 20 carries the contact finger 22 in a sleeve 42 which is secured in the arm between an enlarged head 43 and a threaded nut 44. The finger 22 slides in the bore of the sleeve upon an enlarged diameter section 45 having a shoulder 46 which in one direction abuts a sleeve shoulder 47 as a stop. Inwardly from the abutment or contact end 22a of said finger, a second stop element 48 is mounted on the finger, and an index groove 49 is formed in the finger intermediate the stop 48 and the internal shoulder 47. The inner end portion 22b of the finger 22 is formed with annular grooves thereby presenting a series of teeth 50, much like a rack, which engage a gear wheel 51 of a gear train drive assembly in the head now to be described. A U-shaped bracket 52 is secured to the side of the arm 20 by a screw 53 and by the sleeve nut 44 so that the upper and lower arms 52a and 52b respectively project outwardly to support a drive shaft 54 and an idler shaft 55 arranged in spaced parallel relation. The gear wheel 51 is free to turn relative to the drive shaft 54 and engages a small gear 56 fixed on idler shaft 55. The gear 56 rotates shaft 55 and drives a second larger gear wheel 57 also fixed to this same shaft. The gear wheel 57 engages a final drive gear 58 which is fixed to drive shaft 54. The gear train thus provided is of conventional design and transmits rotation to shaft 54 which carries a pointer 59 at its outer end. The assembly in enclosed by a housing composed of a lower casing 60 fixed by screws 61 to the lower bracket arm 52b, and an upper casing 62 fitted over the lower casing 61 at the stepped lip 63. The upper casing is held in position by screws 64 in the overlapping lip 63. The face of the upper casing 62 supports a dial plate 65 suitably marked with indicia (FIG. 1) for reading the toe measurements of the vehicle wheels. The dial is free to rotate about the shaft 54 as its center and is readily clamped in position by a set screw 66 at its periphery, which set screw has a friction washer 67 cooperating therewith. The dial also has an adjustment handle 68 fixed thereto to facilitate its rotation when the set screw 66 has been released, whereby the dial may be revolved until its zero index is aligned with the pointer 59 when adjusting the finger 22 for an initial setting.

*Operation*

Referring now to the several views of the drawing, and with particularity of FIGS. 2 and 3, the device is adjusted in a preliminary way with the arms 16 and 20 upwardly inclined to approximately the elevation of and near the forward ends of the horizontal diameter of the vehicle wheel W. The finger 18 is retracted from the position of FIGS. 1 or 5 against the stop 31, and finger 22 is also retracted against stop 48 and secured by the set screw 68 (FIG. 7). The gear train in the head 23, of course, will rotate the pointer 59, but there is no particular desire to take a reading at this stage. The operator then sets the vehicle on a level area with the wheel W straight ahead, and maneuvers the device upon its roller carriages 14 until the arm 16 is adjacent the left hand wheel W and the finger end 18a is opposite a spot on the wheel rim R (FIG. 2) at the forward end of the horizontal diameter. This operation will result in arm 20 reaching a similar position adjacent the opposite wheel rim R. The above relation of the device to the vehicle is obtained with wheel W in the position P of FIG. 3 as indicated by the center of the wheel. The finger 18 is next extended its full distance and the set screw 33 is engaged in groove 30 (FIG. 5) to fix this finger. The arms 16 and 20 are then adjusted in elevation and the device is suitably moved bodily on its rollers 15 until the contact face 18a of the finger is touching the spot selected on the left hand wheel rim at the horizontal elevation desired. The operator must then move to the right hand wheel W (as viewed in FIG 2) and release the set screw 68 so that the finger 22 will extend itself until the groove 49 just appears at the end face of the head 43 (FIG. 6) so that the finger may move inwardly against spring load and be urged outwardly, within the limits of the interior shoulder 46 and the external stop 48, for obtaining toe-in or toe-out measurements. With the finger 22 located as described, the slide 19 is adjusted on the base bar 10b until the finger end 22a just contacts a spot on the wheel rim R at the front of a horizontal diameter. The opposite finger 18 may need to be readjusted to restore it to the desired position.

The device is now ready to be set for zero reading on the head 23 which is accomplished by releasing the friction set screw 66 (FIG. 7) and revolving the dial 65 by its knob 68 until the zero index mark M (FIG. 1) is aligned with the position of the pointer 59. The set screw 66 is tightened down to fix the dial 65. Following this operation a mark is made on the side wall of the tire at the finger 22, then the fingers 18 and 22 are retracted as described and, without changing any other part, the device is moved a convenient distance ahead of the vehicle.

The operator moves the vehicle forward one-half rotation of the wheels to the position represented by the center P' of wheel W in FIG. 3 so that the mark on the side wall is now at the rearward position and at or as close to the horizontal diameter as is possible to reach. The device is again repositioned straddling the wheels so that the arms 16 and 20 reach to the rear of the horizontal diameters and the finger 18 is extended again to restore its original setting. The fingers 22 and 18 are adjusted as need to the wheel rims. This may be done by manually retracting finger 22 to afford clearance and then running it out against the rim R. The pointer 59 will move over the dial to a new position displaced relative to the zero mark M and the reading will then be the desired toe measurement of either negative or positive value.

The theory of the toe measurement is based upon the physical fact that any solid part (excluding the tire) of the wheel, rim or hub cap will rotate in a plan perpendicular to the axis of the wheel. Toe-in for a pair of wheels means that the distance between the wheel planes of rotation at points on the horizontal diameters behind the wheel axis is greater than the distance between the planes at points on the same diameters but in front of the wheel axes. Thus, by marking a spot on the wheel at the front of the axis and on the horizontal diameter, and then rotating the wheel one-half turn the same spot will move to the rear location so that finding the distances at the front and rear gives the toe-in measurement. It is convenient to use the device to obtain a zero setting for one distance measurement, say the distance in front of the axis, and then obtain directly on the dial 65 the second or rear measurement in terms of its increment of increase over the front measurement. This is a toe-in value. If the rear measurement is less than the front measurement, the wheels have toe-out.

It has been observed that the finger 22 is spring urged outwardly. The spring device for finger 22 has been shown in FIGS. 6, 7 and 8, and consists in a coil spring 70 having its outer end anchored to a fixed pin 71 carried by the upper arm 52a, although any suitable means may be used to retain the end of the spring. The inner drive end of the spring is engaged on a pin 72 which is engaged in the shaft 54 and tends to roate the shaft 54 and gear 51, through gears 57 and 56, in a direction to urge finger 22 outwardly as desired. The spring takes up back-lash in the gears.

Assuming that the above described measurement has been made and the reading on the dial does not match the manufacturers specification, the operator may make the necessary adjustments in the wheels and observe the dial reading until the desired value is reached. The present device may be temporarily removed while the adjustments are being made, or it may be left in place and the finger 22 temporarily retracted so that the head 23 is not damaged by sudden shock to its gear train.

It is believed that the present invention may be easily understood from the foregoing description, and that the utility and advantages thereof will be appreciated when compared to prior devices. A preferred embodiment has been set forth in great detail, however, various changes and alterations may be made without departing from the scope of the invention as defined by the appended claims.

What is claimed is:

1. A vehicle wheel alignment measuring device including: a pair of roller carriages; an elongated base formed of a hollow section member having substantial stiffness in torsion and bending; means hingedly connecting said roller carriages and said elongated base with said carriages near the opposite ends of said base such that said base swings about the axis of hinged connection relative to said roller carriages; a first arm connected to one end portion of said elongated base and projecting at right angles thereto; a first wheel contact element operably carried near the outer end of said first arm, said element being movable substantially parallel to the axis of said elongated base and being projectible from said arm in a direction toward the other end of said elongated base; a second arm connected to said elongated base near the other end portion thereof and extending at right angles thereto and in substantially the same direction as said first arm; a second wheel contact element operably carried by said second arm near its outer end to move toward and away from said first contact element and in axial alignment therewith; a wheel alignment measuring head on said second arm having an operable connection to said second contact element; and means extending between one of said roller carriages and the nearest arm to adjustably secure said elongated base and both said arms in a wheel measuring position projecting from said elongated base with the outer ends free and said respective contact element in positions simultaneously to engage the vehicle wheels to be measured.

2. The vehicle wheel alignment measuring device set forth in claim 1 wherein one of said hinged connections between a roller carriage and said elongated base comprises a sleeve hinged to said roller carriage and slidably receiving said elongated base such that said sleeve is movable selectvely toward and away from the other roller carriage; and one of said arms being secured to said sleeve to move therewith longitudinally of said elongated base while swinging about the hinged connection.

References Cited in the file of this patent

UNITED STATES PATENTS

| 2,117,267 | Ames | May 17, 1938 |
| 2,178,745 | Emery | Nov. 7, 1939 |
| 2,556,227 | Shaw | June 12, 1951 |

FOREIGN PATENTS

| 1,112,237 | France | Nov. 9, 1955 |